US012036595B2

(12) United States Patent
Davila-Peralta et al.

(10) Patent No.: US 12,036,595 B2
(45) Date of Patent: Jul. 16, 2024

(54) METHOD AND SYSTEM FOR USING INDUCTION HEATING TO SHAPE OBJECTS

(71) Applicant: Arizona Board of Regents on Behalf of the University of Arizona, Tucson, AZ (US)

(72) Inventors: Christian Davila-Peralta, Tucson, AZ (US); Justin Hyatt, Tucson, AZ (US)

(73) Assignee: ARIZONA BOARD OF REGENTS ON BEHALF OF THE UNIVERSITY OF ARIZONA, Tucson, AZ (US)

(*) Notice: Subject to any disclaimer, the term of this patent is extended or adjusted under 35 U.S.C. 154(b) by 489 days.

(21) Appl. No.: 17/286,645

(22) PCT Filed: Oct. 18, 2019

(86) PCT No.: PCT/US2019/057032
§ 371 (c)(1),
(2) Date: Apr. 19, 2021

(87) PCT Pub. No.: WO2020/081998
PCT Pub. Date: Apr. 23, 2020

(65) Prior Publication Data

US 2021/0346932 A1 Nov. 11, 2021

Related U.S. Application Data

(60) Provisional application No. 62/747,892, filed on Oct. 19, 2018.

(51) Int. Cl.
*B21D 22/02* (2006.01)
*H05B 6/06* (2006.01)
(Continued)

(52) U.S. Cl.
CPC ............ *B21D 22/022* (2013.01); *H05B 6/06* (2013.01); *H05B 6/102* (2013.01); *H05B 6/362* (2013.01)

(58) Field of Classification Search
CPC ...... B21D 22/022; B21D 26/14; H05B 6/101; H05B 6/102; H05B 6/362
(Continued)

(56) References Cited

U.S. PATENT DOCUMENTS 3,210,509 A 10/1965 Fritz
3,251,974 A 5/1966 Seyfried
(Continued)

FOREIGN PATENT DOCUMENTS

CN 1284901 A 2/2001
CN 102248259 A 11/2011
(Continued)

OTHER PUBLICATIONS

EP 2955239A1, Kotzian et al. Dec. 2015.*
(Continued)

*Primary Examiner* — Edward T Tolan
(74) *Attorney, Agent, or Firm* — Thomas | Horstemeyer, LLP

(57) ABSTRACT

A method and system are provided for using induction heating to shape a work piece panel into a preselected shape. The method includes positioning a work piece panel near or in abutment with at least a first induction coil. Alternating current (AC) having a preselected amplitude and frequency can be passed through at least the first induction coil while the work piece panel is subjected to at least one preselected shaping condition. An alternating electromagnetic field produced by the AC current, can cause eddy current in the work piece panel that can heat it to a preselected temperature for a preselected period of time while subjected to the preselected shaping condition, thereby causing the work piece panel to attain the preselected shape. The alternating electromagnetic field can also create a repelling electromagnetic
(Continued)

force between the coil and the work piece panel, which could be a shaping condition.

20 Claims, 17 Drawing Sheets

(51) Int. Cl.
*H05B 6/10* (2006.01)
*H05B 6/36* (2006.01)

(58) Field of Classification Search
USPC ........................................................ 72/413
See application file for complete search history.

(56) References Cited

U.S. PATENT DOCUMENTS

| | | | | |
|---|---|---|---|---|
| 3,815,395 | A * | 6/1974 | Sass | B21D 22/18 72/342.1 |
| 6,578,399 | B1 * | 6/2003 | Haas | B21D 47/00 72/413 |
| 7,076,981 | B2 * | 7/2006 | Bradley | B21D 26/14 29/419.2 |
| 7,085,305 | B2 | 8/2006 | Richardson | |
| 7,574,884 | B2 * | 8/2009 | Carsley | B21D 26/055 72/342.92 |
| 7,582,851 | B2 | 9/2009 | Fishman et al. | |
| 7,954,357 | B2 * | 6/2011 | Bradley | B21D 26/14 72/466.8 |
| 8,266,938 | B2 * | 9/2012 | Bradley | B21D 26/14 72/707 |
| 8,614,409 | B2 | 12/2013 | Stuehr et al. | |
| 10,384,253 | B2 * | 8/2019 | Sakane | B21D 37/16 |
| 10,791,591 | B1 * | 9/2020 | Gariglio | H05B 6/102 |
| 2005/0217334 | A1 | 10/2005 | Bradley et al. | |
| 2006/0086165 | A1 | 4/2006 | Golovashchenko et al. | |
| 2007/0063385 | A1 | 3/2007 | Carsley et al. | |
| 2008/0230957 | A1 | 9/2008 | Feigenblum et al. | |
| 2009/0235715 | A1 * | 9/2009 | Werz | B21D 53/20 72/342.1 |
| 2012/0067100 | A1 * | 3/2012 | Stefansson | C21D 1/42 72/342.1 |
| 2014/0083155 | A1 * | 3/2014 | Matsen | B29C 70/48 72/364 |
| 2016/0136712 | A1 | 5/2016 | Ooyama et al. | |
| 2017/0369355 | A1 | 12/2017 | Angel et al. | |

FOREIGN PATENT DOCUMENTS

| | | | | |
|---|---|---|---|---|
| CN | 105127284 | A | 12/2015 | |
| CN | 204844599 | U | 12/2015 | |
| CN | 107127243 | A | 9/2017 | |
| CN | 107584001 | A | 1/2018 | |
| CN | 108284146 | A | 7/2018 | |
| DE | 102012004439 | B3 | 7/2013 | |
| GB | 2192294 | A * | 1/1988 | H05B 6/06 |
| TW | 446624 | B | 7/2001 | |
| WO | 2015013844 | A1 | 2/2015 | |

OTHER PUBLICATIONS

International Search Report dated Jan. 9, 2020 in co-pending PCT Application No. PCT/US2019/057032.

Titov, “Development and investigation of a symmetric indution heating unit for spherical shape metal ware”, Journal of Chemical Technolgoy and Metallurgy, 53, 5, 2018.

Lee, et al. “An approach to triangular induction heating in final precision forming of thick steel plates” (Apr. 2014 Journal of Materials Processing Technology 214(4):1008-1017.

Extended European Search Report for PCT/US2019057032 Mailed Jun. 14, 2022.

Office Action for 201980069649.X mailed Nov. 22, 2022.

* cited by examiner

1

METHOD AND SYSTEM FOR USING INDUCTION HEATING TO SHAPE OBJECTS

CROSS-REFERENCE TO RELATED APPLICATIONS

The present application is being filed under 35 U.S.C. § 371 as a U.S. National Phase Application of PCT International Application No. PCT/US2019/057032 filed on Oct. 18, 2019, entitled "METHOD AND SYSTEM FOR USING INDUCTION HEATING TO SHAPE OBJECTS," which claims priority to, and the benefit of, U.S. Provisional Application No. 62/747,892, filed Oct. 19, 2018, both of which are incorporated herein by reference in their entireties.

TECHNICAL FIELD

The present disclosure is directed to methods and systems for using induction heating and electromagnetic forces to shape objects.

BACKGROUND

Shaped metal sheets, or panels, are used for a variety of purposes. For example, shaped metal panels are often used to make radio telescopes or antennas. Typically, such an antenna dish will be fabricated from panel segments of many different surface shapes. Such panels may be difficult and expensive to manufacture, each differently shaped panel being replicated from a mold(s) of different shape. The state of the art processes for manufacturing these panels includes spinning, cold stamping, hot stamping, and machining.

Machining of such curved metal panels can achieve high accuracy, but may be time consuming and may waste removed material. Spinning and stamping typically involve using a mold(s) made by machining mold(s) to fine scale surface accuracy, which can be time-consuming. Cold stamping requires relatively large forces to shape the cold metal. Large rigid mold(s) may need to be thick to hold their shape accuracy under these loads. Hot stamping may require preheating the blank work piece panel, and then stamping the hot, softer blank work piece. This heating is often accomplished with radiation and/or convection ovens.

One of the problems with the convection/radiation molding process is that it requires heating up the furnace, including its walls, the mold(s), the conveyor, and the surrounding air before the work piece reaches a forming temperature. This requirement makes the process slow and inefficient to perform. In addition, radiation/convection ovens naturally tend toward isothermal heating, making it difficult to heat specific areas of a workpiece to different temperatures, which renders the process less suitable for forming panels with complicated geometries, such as ribbed panels. Also, using computer adjustable mold(s) at high temperatures is difficult because the surface of the mold(s) has to be at high temperature while the electronic actuators that adjust the mold(s) need to be maintained at much lower temperatures requiring complicated and expensive insulation and cooling configurations.

Induction is currently used in various state-of-the-art metal working processes to preheat a workpiece to be shaped. The repulsive electromagnetic force generated between the induction coil and the work piece is generally seen as a difficulty that must be resisted or worked around.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

In FIG. 3C, the induction coil has changed its shape to follow the deforming work piece panel.

DETAILED DESCRIPTION

Figure 1A:
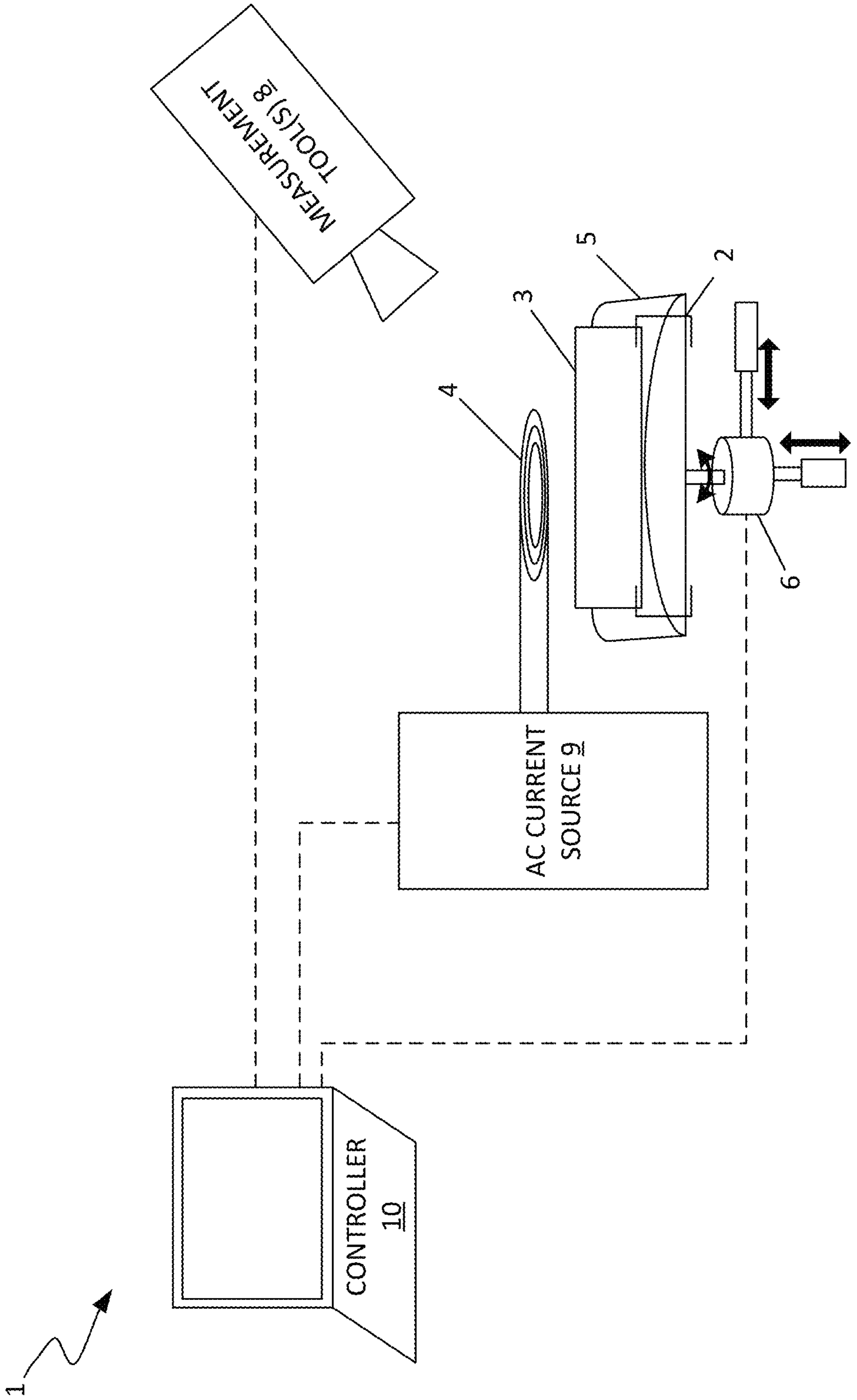
FIG. 1A is a block diagram of the system for using induction heating to shape panels in accordance with a representative embodiment.

The inventive principles and concepts are directed to a method and system for using induction heating to shape a work piece panel into a preselected shape. In accordance with a representative embodiment, the method comprises positioning and orienting a work piece panel comprising a preselected material in a preselected position with a preselected orientation near or in abutment with at least a first induction coil, subjecting the work piece panel to at least one preselected shaping condition, using an AC current source to generate a first AC current having a preselected amplitude and frequency, and passing the first AC current through the induction coil(s) while the work piece panel is subjected to the preselected shaping condition(s). Passing the first AC current through the first induction coil causes the first induction coil to produce a first alternating electromagnetic field that induces alternating electrical (Eddy) currents in the workpiece panel that heat the work piece panel to a preselected temperature for a preselected period of time. The Eddy currents create their own electromagnetic field opposing the one created by the current flowing in the induction coil(s), hence creating a repulsive force that presses the work piece against the mold. The work piece panel is subjected to the preselected shaping condition(s), thereby causing the work piece panel to attain the preselected shape. In some embodiments, the preselected shaping condition(s) can consist solely of the repelling force created by the Eddy currents flowing in the work piece panel, which causes the work piece panel to be pressed against the mold(s).

In accordance with a representative embodiment, the system comprises a holder, at least a first AC current source, and at least a first induction coil. The holder of the system holds the work piece panel in a preselected position and orientation near or in abutment with the induction coil(s) while the work piece panel is subjected to at least one preselected shaping condition. The AC current source(s) is electrically coupled to the induction coil(s). The AC current source(s) generates at least a first AC current having a preselected amplitude and frequency. The AC current is passed through the induction coil(s) while the work piece panel is subjected to the preselected shaping condition(s) to cause the induction coil(s) to produce a first alternating electromagnetic field that produces eddy currents in the work piece panel that heat the work piece panel to a preselected temperature for a preselected period of time. Heating the work piece panel to the preselected temperature for the preselected period of time while the work piece panel is subjected to the preselected shaping condition(s) causes the work piece panel to attain the preselected shape.

The method and system in accordance with the inventive principles and concepts overcome the aforementioned problems associated with processes that are currently used to shape sheets and panels. Firstly, induction heating in accordance with the inventive principles and concepts can be used to perform thermoforming, slumping, or sagging, to shape panels into preselected shapes without requiring the heating of a furnace, its walls, the surrounding air, or the mold(s), as is required with current slumping or hot stamping processes. Eliminating this requirement allows the speed of the process to be increased while also reducing costs. Secondly, induction heating in accordance with the inventive principles and concepts can be precisely controlled to enable even heating over the work piece panel, or to enable a temperature gradient to exist in the work piece panel that is precisely controlled. This latter feature makes the process suitable for forming panels with complicated geometries, such as ribbed panels, for example. It also allows heating portions of the work piece panel that need to deform more to higher temperatures while leaving portions that will remain relatively flat at relatively lower temperatures.

A few representative embodiments of the system and method for using induction heating to shape objects will now be described with reference to FIGS. 1A-13, in which like reference numerals represent like components, elements or features. It should be noted that features, elements or components in the figures are not intended to be drawn to scale, emphasis being placed instead on demonstrating inventive principles and concepts. It should be noted that the inventive principles and concepts are not limited to the representative embodiments described herein, as will be understood by those of skill in the art in view of the description provided herein.

In the following detailed description, for purposes of explanation and not limitation, exemplary, or representative, embodiments disclosing specific details are set forth in order to provide a thorough understanding of inventive principles and concepts. However, it will be apparent to one of ordinary skill in the art having the benefit of the present disclosure that other embodiments according to the present teachings that are not explicitly described or shown herein are within the scope of the appended claims. Moreover, descriptions of well-known apparatuses and methods may be omitted so as not to obscure the description of the exemplary embodiments. Such methods and apparatuses are clearly within the scope of the present teachings, as will be understood by those of skill in the art. It should also be understood that the word "example," as used herein, is intended to be non-exclusionary and non-limiting in nature.

The terminology used herein is for purposes of describing particular embodiments only, and is not intended to be limiting. The defined terms are in addition to the technical, scientific, or ordinary meanings of the defined terms as commonly understood and accepted in the relevant context.

The terms "a," "an" and "the" include both singular and plural referents, unless the context clearly dictates otherwise. Thus, for example, "a device" includes one device and plural devices. The terms "substantial" or "substantially" mean to within acceptable limits or degrees acceptable to those of skill in the art. For example, the term "substantially parallel to" means that a structure or device may not be made perfectly parallel to some other structure or device due to tolerances or imperfections in the process by which the structures or devices are made. The term "approximately" means to within an acceptable limit or amount to one of ordinary skill in the art. Relative terms, such as "over," "above," "below," "top," "bottom," "upper" and "lower" may be used to describe the various elements' relationships to one another, as illustrated in the accompanying drawings. These relative terms are intended to encompass different orientations of the device and/or elements in addition to the orientation depicted in the drawings. For example, if the device were inverted with respect to the view in the drawings, an element described as "above" another element, for example, would now be below that element.

Relative terms may be used to describe the various elements' relationships to one another, as illustrated in the accompanying drawings. These relative terms are intended to encompass different orientations of the device and/or elements in addition to the orientation depicted in the drawings.

The term "memory" or "memory device," as those terms are used herein, are intended to denote a non-transitory computer-readable storage medium that is capable of storing computer instructions, or computer code, for execution by one or more processors. References herein to "memory" or "memory device" should be interpreted as one or more memories or memory devices. The memory may, for example, be multiple memories within the same computer system. The memory may also be multiple memories distributed amongst multiple computer systems or computing devices.

A "processor" or "processing device," as those terms are used herein encompass an electronic component that is able to execute a computer program or executable computer instructions. References herein to a system comprising "a processor" or "a processing device" should be interpreted as a system having one or more processors or processing cores. The processor may for instance be a multi-core processor. A processor may also refer to a collection of processors within a single computer system or distributed amongst multiple computer systems. The term "computer," as that term is used herein, should be interpreted as possibly referring to a single computer or computing device or to a collection or network of computers or computing devices, each comprising a processor or processors. Instructions of a computer program can be performed by a single computer or processor or by multiple processors that may be within the same computer or that may be distributed across multiple computers.

A "coil," as the term is used herein, encompasses an electrical conductor used to induce an electromagnetic field. As will be understood by those of skill in the art, a coil may be flat, or helical, or have a more complicated shape designed to induce certain eddy currents in a particular workpiece. The descriptions herein are not intended to limit coil shapes or configurations of coils to those described herein or shown in the figures.

Figure 1B:
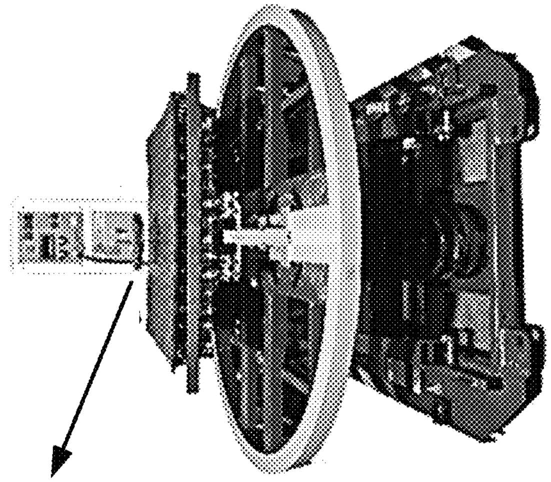
FIG. 1B is a perspective view of the system shown in FIG. 1A in accordance with a representative embodiment.
Figure 1C:
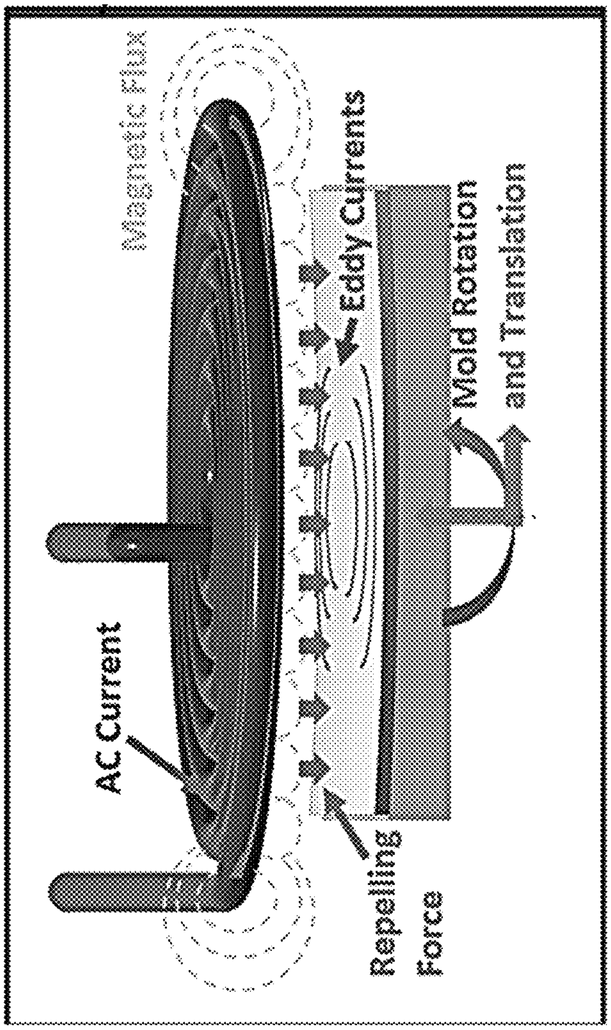
FIG. 1C is a perspective view of a portion of the system shown in FIG. 1B depicting the electromagnetic repelling force created by Eddy currents flowing in the work piece panel.

FIG. 1A is a block diagram of the system 1 for using induction heating to shape panels in accordance with a representative embodiment. FIG. 1B is a perspective view of an example layout of the system 1 shown in FIG. 1A in accordance with an embodiment. FIG. 1C is a perspective view of a portion of the system shown in FIG. 1B depicting the repelling force created by Eddy currents flowing in the work piece panel, which are created by the electromagnetic field associated with the AC current flowing in the induction coil(s). With reference to FIG. 1A, a holder 2 of the system 1 is typically used to hold the work piece panel 3 in a preselected position and orientation near or in abutment with the induction coil(s) 4 while the work piece panel 3 is subjected to at least one preselected shaping condition. The aforementioned preselected shaping condition(s) to which the work piece panel 3 is subjected can be one or more of, for example, application of a mechanical force to one or more surfaces of the work piece panel 3, orienting the system 1 such that gravity acts in a particular direction relative to the system 1, application of an electromagnetic force to one or more surfaces of the work piece panel 3, active or passive movement of the induction coil(s) 4 relative to the work piece panel 3, placing the work piece panel 3 in contact with a mold(s) 5, movement of the mold(s) 5 in a preselected manner into contact with the work piece panel 3, varying the frequency and/or amplitude of the AC current passing through the induction coil(s) 4, varying the temperature of one or more portions of the work piece panel 3, varying the alternating electromagnetic field produced by the induction coil(s) 4, heating different portions of the work piece panel 3 to different temperatures and/or for different periods of time, etc.

The holder 2 may be a separate component of the system 1 or it may be, for example, a surface of the mold(s) 5. As will be described below in more detail, the induction coil(s) 4 may have a variety of configurations and may be partially or wholly embedded within the work piece panel 3 and/or the mold(s) 5. One or more actuator tools 6 may be mechanically coupled to the induction coil(s) 4, the work piece panel 3 and/or the mold(s) 5 for adjusting the position and/or orientation of the induction coil(s) 4, the work piece panel 3 and/or the mold(s) 5 before or during the deformation process. For example, the actuator tool(s) 6 may be used to create relative rotating or translating motion between the work piece panel 3 and/or the mold(s) 5 and the induction coil(s) 4 to ensure even distribution of heat over the work piece panel 3.

A controller 10, which may comprise, for example, some type of processor or computer (e.g., a microcontroller or a microprocessor), may be used to control one or more of the actuator tool(s) 6. Control of the actuator tool(s) 6 by the controller 10 may be based on measurements obtained by one or more measurement tools 8. In other words, the system 1 may include a feedback loop that feeds back measurement information to the controller 10, which it then uses to control the coil(s) 4, the actuator tool(s) 6 and/or the measurement tool(s) 8. The measurement tool(s) 8 may include contact measurement tools such as, for example, mechanical sensors, and non-contact measurement tools such as, for example, optical sensors, magnetic sensors, temperature sensors, or a combination of contact and non-contact measurement tools.

The measurement tool(s) 8 may be used to measure, for example, the frequency of the alternating electromagnetic field produced by the induction coil(s) 4, the inductance of the induction coil(s) 4, the position of the induction coil(s) 4 relative to the work piece panel 3, the position of the work piece panel 4 relative to the mold(s) 5, the amplitude of the AC current passing through the induction coil(s) 4. Based on one or more of these or other measurements, the controller 10 can control the actuator tool(s) 6 and/or to control the AC current source(s) 9 to set the amplitude and/or the frequency of the AC current generated by the AC current source(s) 9 to control the induction heating process. As indicated above, the AC current source(s) 9 of the system 1 generates an AC current of a preselected amplitude and frequency that is electrically coupled into the induction coil(s) 4. The controller 10 may control the AC current source(s) 9 to set the amplitude and frequency of the AC current to the preselected amplitude and frequency. The term "preselected," as that term is used herein, can mean a starting or initial value that is intended to be a permanent value that is not varied over the course of the process as well as a starting value that is intended to be subsequently varied based on feedback obtained during the process. It should also be noted that although a single AC current source 9 and a single coil 4 are shown in FIG. 1A, multiple AC current sources may be used in the system 1 for controlling the AC currents passing through multiple coils 4.

Figure 2:
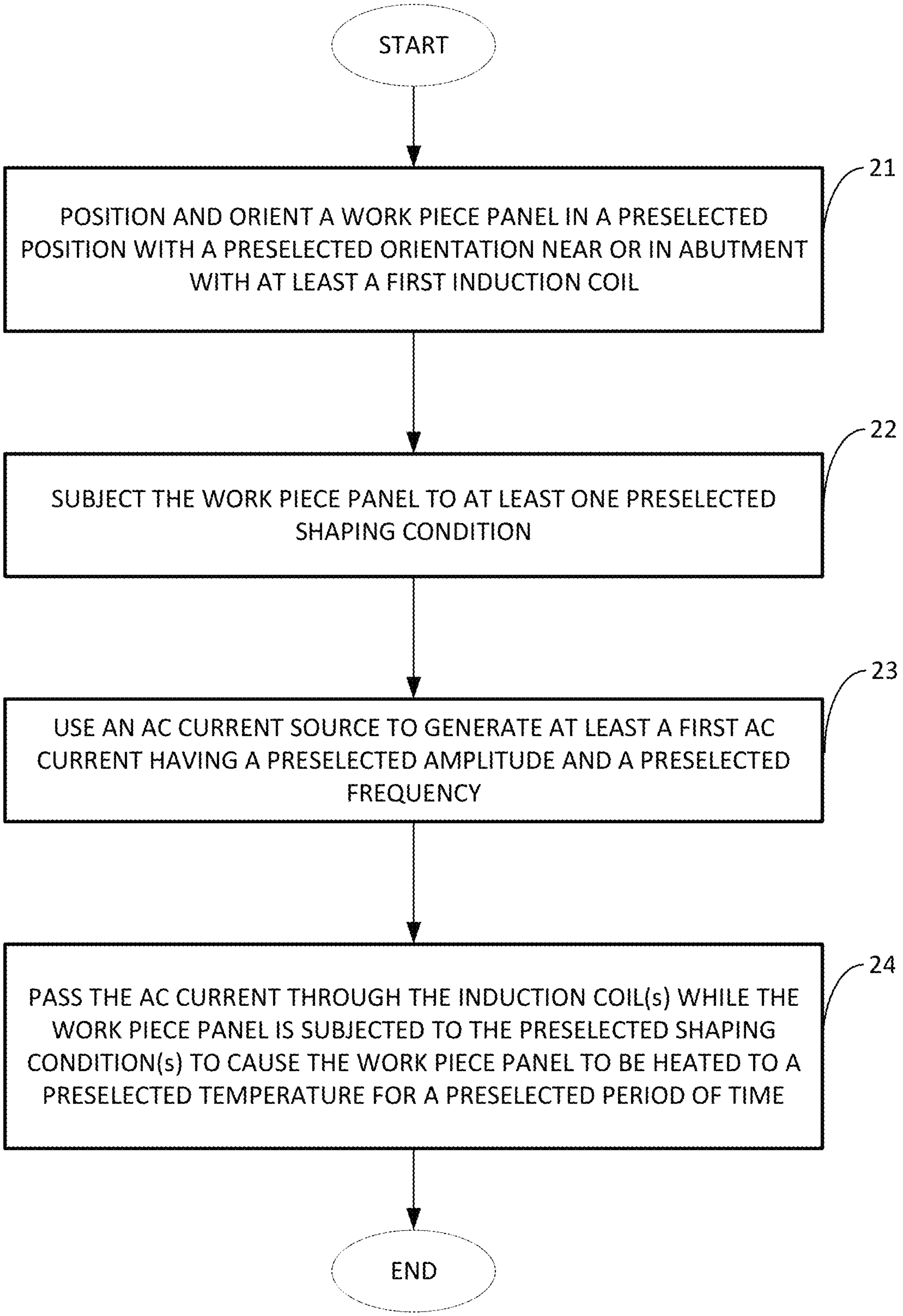
FIG. 2 is a flow diagram representing the method for performing induction heating to shape panels in accordance with a representative embodiment.

FIG. 2 is a flow diagram representing the method for performing induction heating to shape panels in accordance with an embodiment. In accordance with this embodiment, the method comprises the following. A work piece panel comprising a preselected material is positioned near or in abutment with at least a first induction coil, as indicated by block 21. The work piece panel is subjected to at least one preselected shaping condition, as indicated by block 22. At least a first AC current source is used to generate a first AC current having a preselected amplitude and frequency, as indicated by block 23. The first AC current having the preselected amplitude and frequency is passed through at least a first induction coil while the work piece panel is subjected to the preselected shaping condition to cause the first induction coil to produce a first alternating electromagnetic field that heats the work piece panel via induction to a preselected temperature for a preselected period of time, as indicated by block 24. Heating the work piece panel via induction to the preselected temperature for the preselected period of time while the work piece panel is subjected to the preselected shaping condition causes the work piece panel to attain the preselected shape.

The method depicted in FIG. 2 can further include steps described above with reference to FIG. 1A of using the measurement tool(s) 8 to measure, for example, the frequency of the alternating electromagnetic field produced by the induction coil(s) 4, the inductance of the induction coil(s) 4, the position of the induction coil(s) 4 relative to the work piece panel 3, the position of the work piece panel 4 relative to the mold(s) 5, the amplitude of the AC current passing through the induction coil(s) 4. Based on one or more of these or other measurements, the controller 10 can control the actuator tool(s) 6 and/or to control the AC current source(s) 9 to set the amplitude and/or the frequency of the AC current generated by the AC current source(s) 9 to control the induction heating process.

Figure 3A:
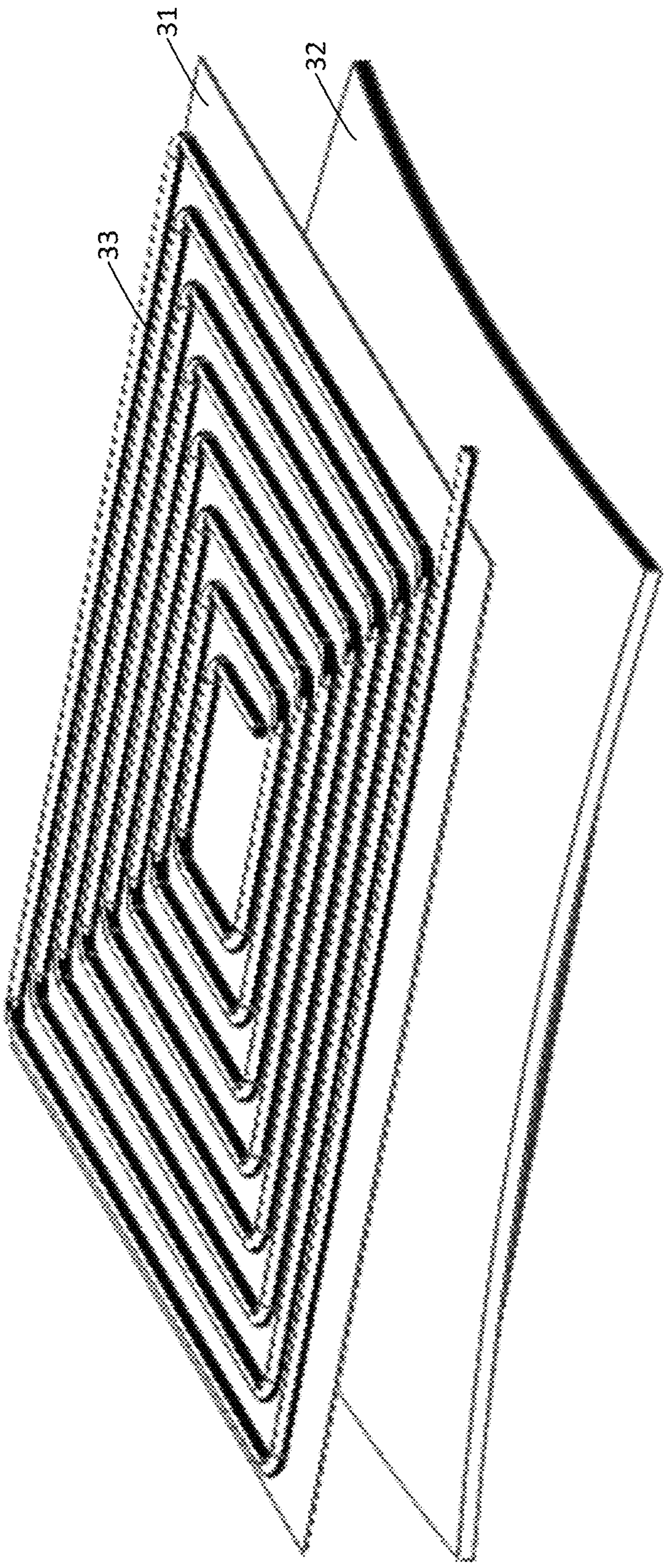
FIG. 3A shows a flat metal work piece panel disposed above a precisely-shaped mold(s) and having an induction coil disposed near or in abutment with a top surface of the work piece panel.
Figure 3B:
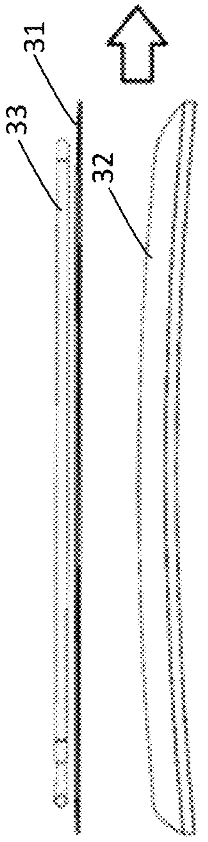
FIGS. 3B and 3C show side views of the work piece panel and the induction coil shown in FIG. 3A before and after the induction heating process, respectively.
Figure 3C:
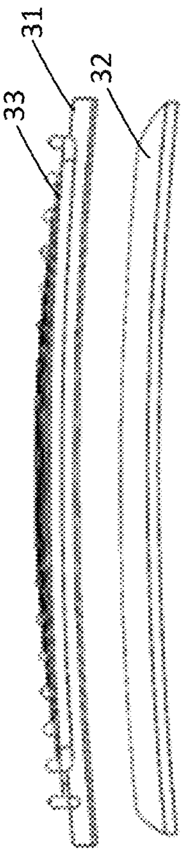

FIG. 3A shows a metal work piece panel 31 that is initially in the shape of a flat sheet of metal. The work piece panel 31 is shown disposed above a precisely-shaped mold 32 and having an induction coil 33 disposed near or in abutment with a top surface of the work piece panel 31. In accordance with other embodiments, the work piece panel is made of a non-metal material having magnetic particles disposed on it or in it (e.g., a plastic material having ferrous particles dispersed therein, or a glass sheet with a metallic coating). FIGS. 3B and 3C show side views of the work piece panel 31 and the induction coil 33 before and after the induction heating process, respectively. During the induction heating process, the work piece panel 31 is subjected to at least one shaping condition, which in this embodiment is the panel 31 being placed in contact with the mold 32 to cause the panel 31 to attain the shape of the mold 32, as shown in FIG. 3C. In accordance with a representative embodiment, the induction coil 33 has a substantially flat spiral, or pancake, geometry, but the induction coil(s) may deform actively or passively to change or maintain the distance between the coil(s) and the work piece panel as shown in FIG. 3C.

During the induction heating process, the work piece panel 31 is typically heated to a temperature below a melting point of the preselected material while the work piece panel 31 changes shape to attain the preselected shape. For example, the process represented by FIGS. 3A-3C may be a thermoforming, or slumping, or sagging, process during which the work piece panel 31 is typically heated to a temperature below a melting point of the preselected material and brought into contact with the mold(s) 32 to cause it to change shape to attain the preselected shape.

Figure 4A:
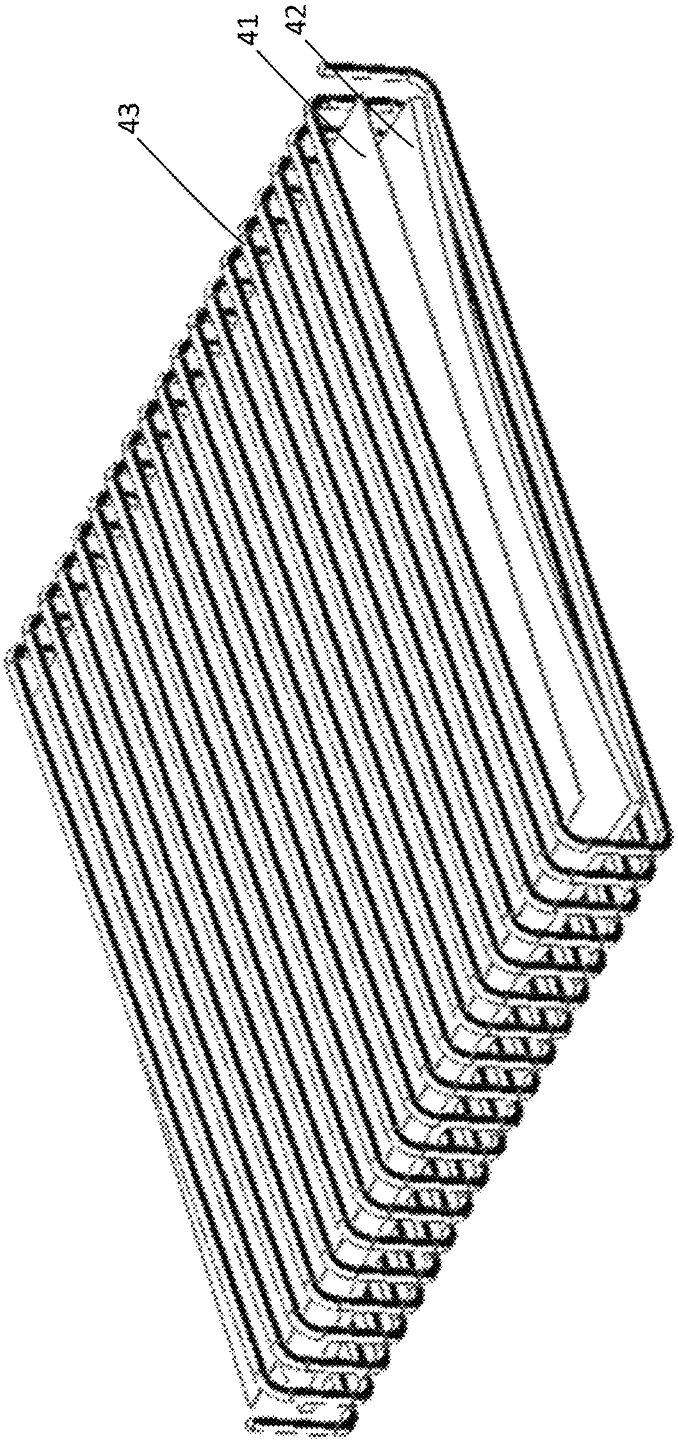
FIGS. 4A and 4B show perspective and side views, respectively, of a work piece panel, a mold and an induction coil in accordance with an embodiment in which the induction coil wraps around the work piece panel and the mold.
Figure 4B:
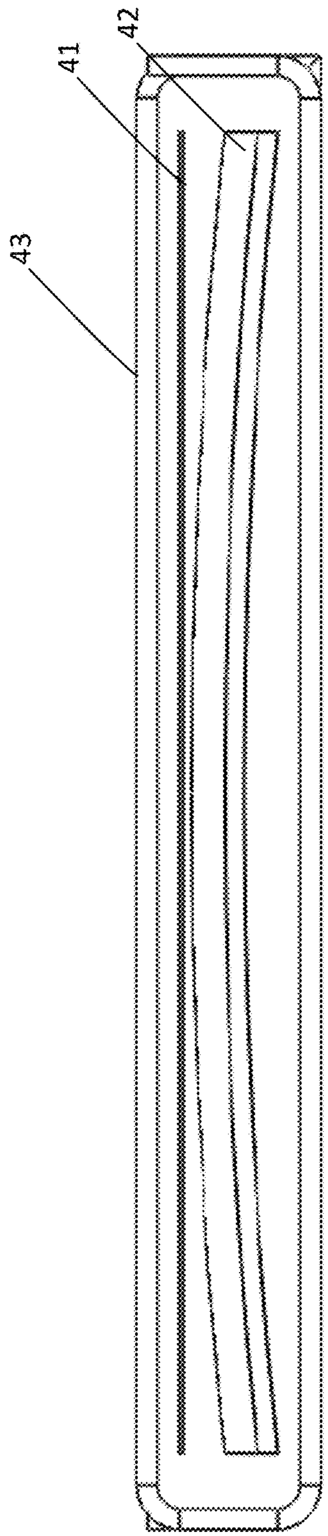

The induction coil(s) may take on any suitable configuration, orientation or shape. FIGS. 4A and 4B show perspective and side views, respectively, of a work piece panel 41, a mold 42 and an induction coil 43. In accordance with this embodiment, the induction coil 43 wraps around the work piece panel 41 and the mold(s) 42.

Figure 5:
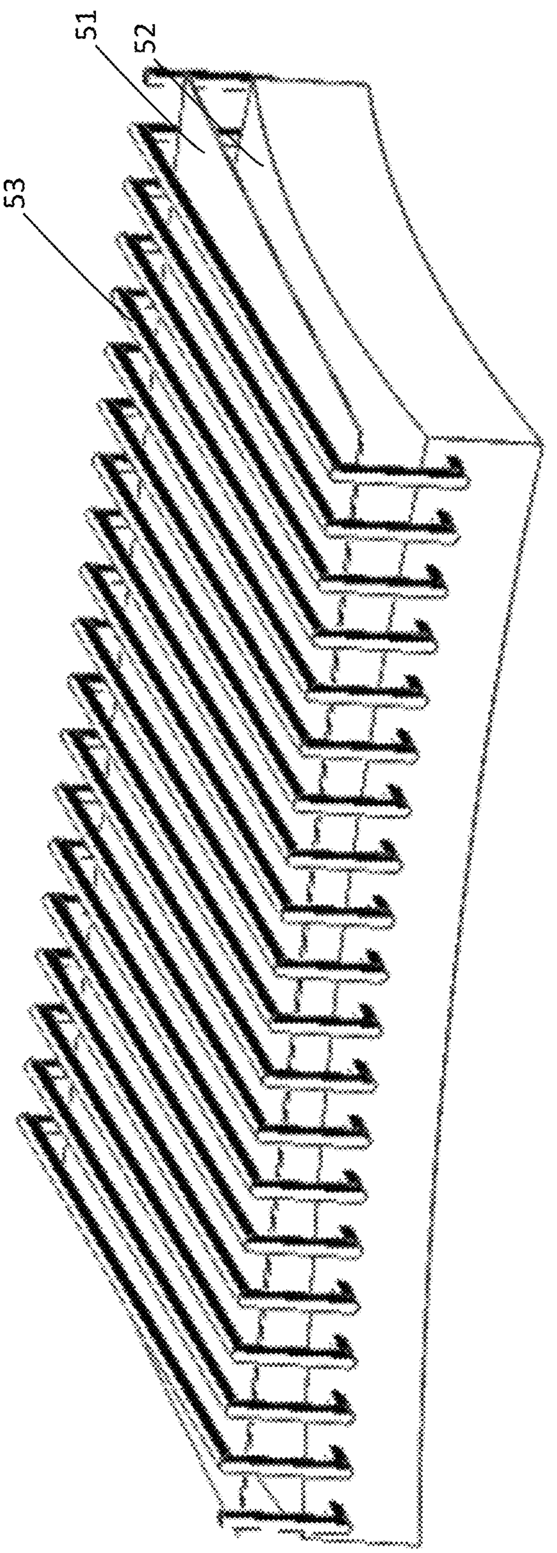
FIG. 5 shows a perspective view of a work piece panel, a mold and an induction coil in accordance with an embodiment in which the induction coil wraps around the work piece panel and passes through the mold.

In accordance with another representative embodiment, the induction coil(s) wrap around the work piece panel (e.g., a metal sheet) and pass through at least a first molding surface to reduce a distance between the coil(s) and the work piece panel. FIG. 5 shows a perspective view of a work piece panel 51, a mold 52 and an induction coil 53 in accordance with an embodiment in which the induction coil 53 wraps around the work piece panel 51 and passes through the mold 52.

A skin depth of induction heating in the work piece panels can be controlled by setting the frequency of the AC current generated by the AC current source 9 to the preselected frequency. Thus, in some cases, the controller 10 controls the AC current source 9 to control the skin depth of the current in the work piece panel to thereby control the induction heating. The method represented by the flow diagram shown in FIG. 2 may include using a feedback loop to cause the controller 10 to adjust the frequency of the AC current generated by the AC current source 9 to control the skin depth of the current in the work piece panel to thereby control the induction heating of the panel.

In accordance with a representative embodiment, the molds 32, 42 and 52, or at least one respective surface thereof, have rigid, unchanging shapes. However, in accordance with other embodiments, the mold or molds may each comprise a plurality of segments having respective adjustable positions and orientations relative to the work piece panel to cause the work piece panel to attain the preselected shape. This feature allows a single mold or mold set to be used to shape a work piece panel into a preselected shape and then afterward to change shape of the mold(s) to form a different work piece panel into a different shape. This also allows a mold(s) to change shape during a thermoforming operation in response to real-time measurements, e.g., measurements obtained by measurement tool(s) 8 (FIG. 1A).

Figure 6:
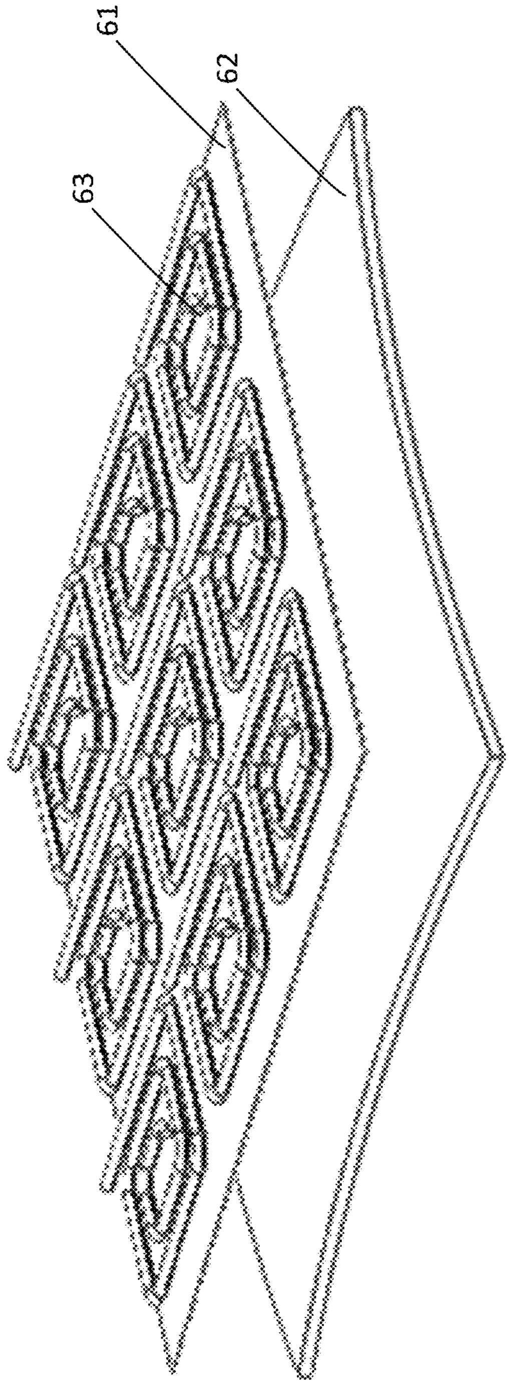
FIG. 6 is a perspective view of a work piece panel, a mold and an array of induction coils in accordance with an embodiment in which multiple induction coils are positioned near or in abutment with at least a top side of the work piece panel to heat at least the first side of the work piece panel via induction.

In accordance with a representative embodiment, an array of multiple induction coils is positioned near or in abutment with at least a first side of the work piece panel to heat at least the first side of the work piece panel via induction. FIG. 6 is a perspective view of a work piece panel 61, a mold 62 and an array of spiral induction coils 63 in accordance with an embodiment in which the induction coils 63 are positioned near or in abutment with at least a top side of the work piece panel 61 to heat at least the top side of the work piece panel 61 via induction to the preselected temperature for the preselected period of time to cause it to attain a desired, preselected shape.

Figure 7:
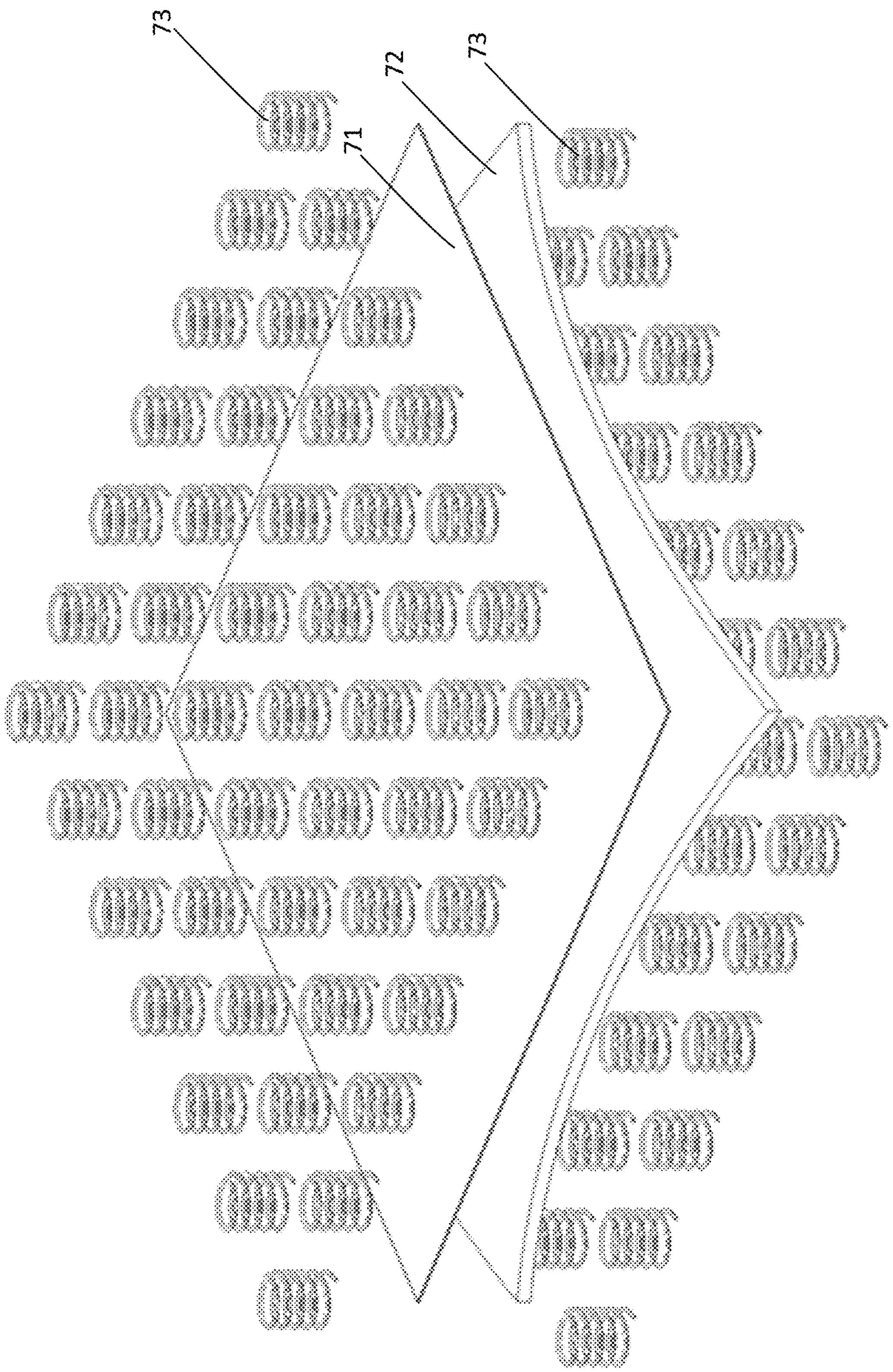
FIG. 7 is a perspective view of a work piece panel, a mold and an array of induction coils in accordance with an embodiment in which one or more induction coils are positioned near or in abutment with at least a top side of the work piece panel and one or more induction coils are positioned near or adjacent to at least one other side of the work piece panel.

FIG. 7 is a perspective view of a work piece panel 71, a mold 72 and an M-by-N array of helical induction coils 73 in accordance with an embodiment in which a plurality of the induction coils 73 of the array are positioned near or in abutment with at least a top side of the work piece panel 71 and a plurality of induction coils 73 are positioned near or in abutment with a surface of the mold 72. As indicated above, the induction coils can have any suitable shape or configuration, as indicated by the difference between the shapes or configurations of the induction coils 63 and 73 shown in FIGS. 6 and 7, respectively.

Figure 8A:
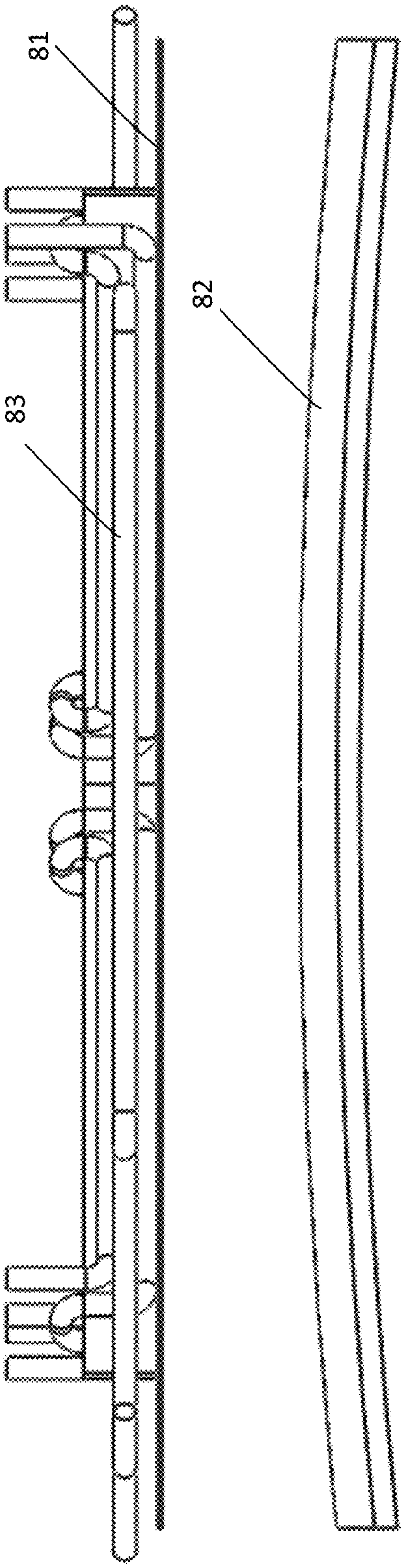
FIG. 8A shows a side view of a work piece panel, a mold and a plurality of induction coils for heating respective portions of the surface of the work piece panel in accordance with an embodiment in which certain induction coils are designed to heat certain features of the work piece panel such as flat portions and ribs, for example.
Figure 8B:
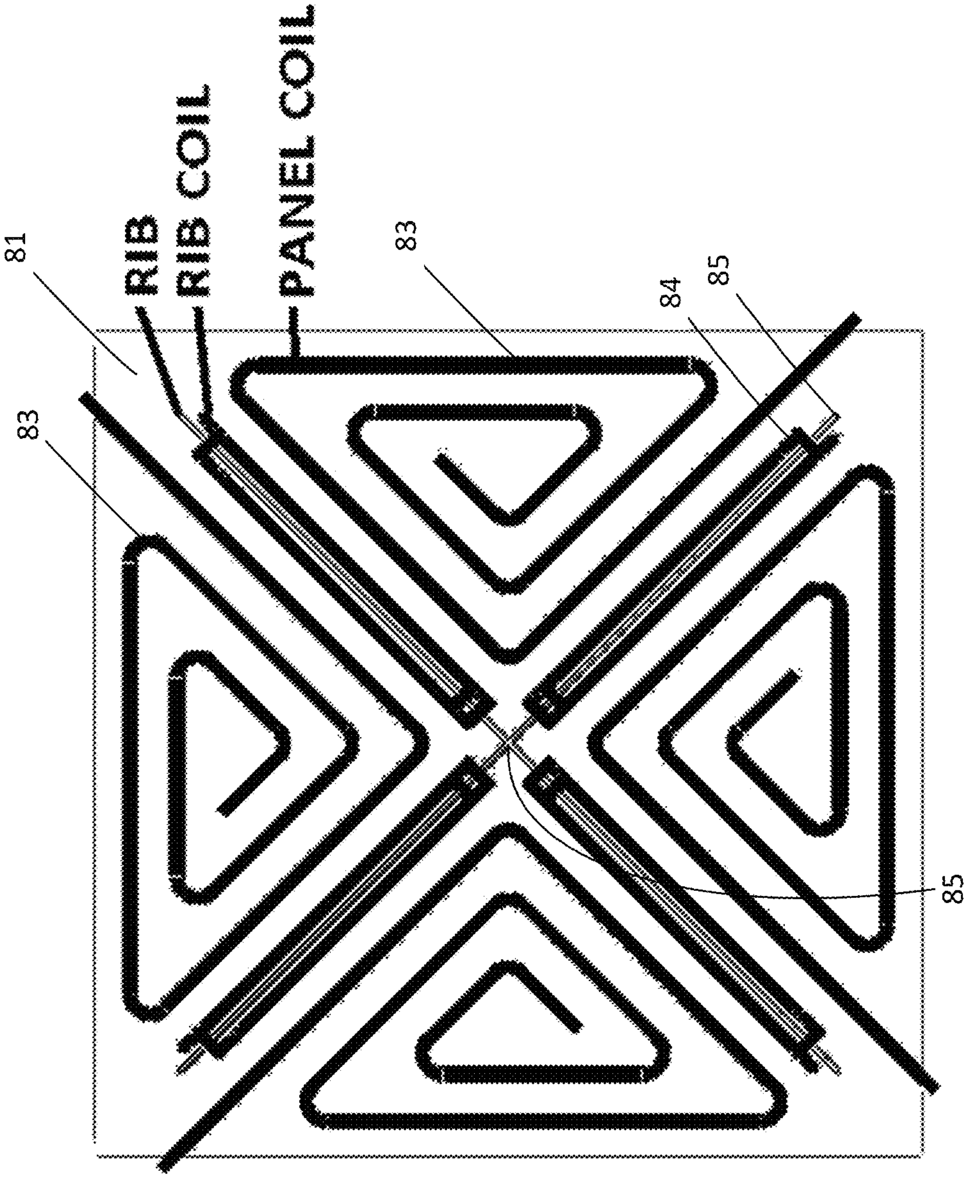
FIG. 8B shows a top plan view of the work piece panel, the mold and the plurality of induction coils shown in FIG. 8A.
Figure 8C:
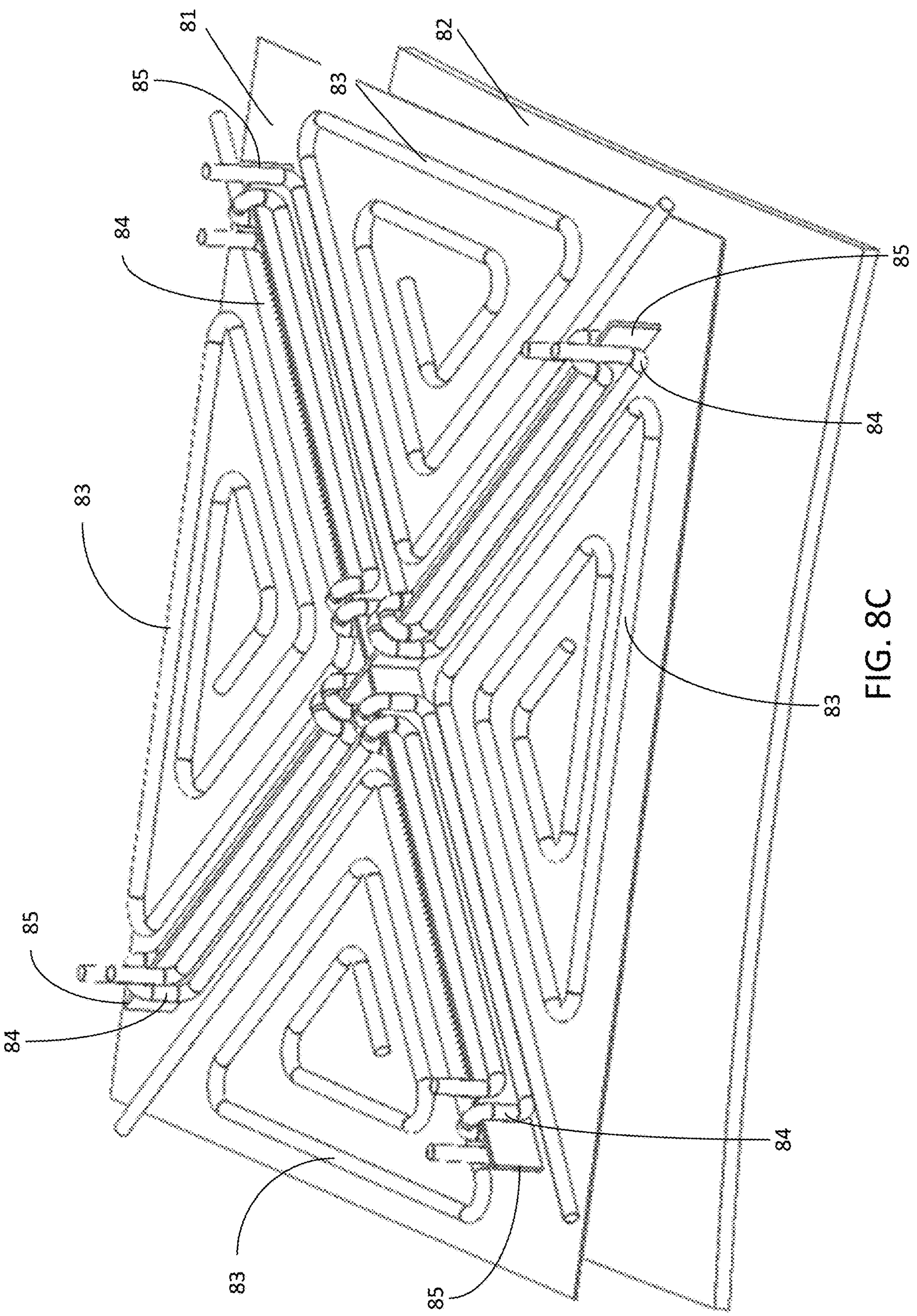
FIG. 8C shows a perspective view of the work piece panel, the mold and the plurality of induction coils shown in FIGS. 8A and 8B.

FIG. 8A shows a side view of a work piece panel 81, a mold 82 and a plurality of induction coils 83 for heating respective portions of a surface of the work piece panel 81 in accordance with an embodiment in which certain induction coils 83 are designed to heat certain features of the work piece panel 81 such as flat portions and ribs, for example. In FIG. 8A, the work piece panel 81 is shown spaced apart from the mold 82 and the induction coils 83 are shown in contact with the top surface of the work piece panel 81. FIG. 8B shows a top plan view of the work piece panel 81 and the plurality of induction coils 83. FIG. 8C shows a perspective view of the work piece panel 81, the mold 82 and the plurality of induction coils 83 with the work piece panel 81 spaced apart from the mold 82.

In accordance with a representative embodiment, in cases where a plurality of induction coils are used (e.g., FIGS. 6-8C), the induction coils may be independently controlled to thereby independently set the preselected amplitudes and/or preselected frequencies of the induction coils to thereby independently control induction heating of different portions of the work piece panel. In accordance with a representative embodiment, the different portions of the work piece panel are heated by the respective induction coils at different speeds or to different temperatures.

In accordance with a representative embodiment, the positioning and orientation of the work piece panel and the subjection of the work piece panel to the preselected shaping condition(s) are such that the work piece panel sags due to the force of gravity exerted on the work piece panel during heating to cause the work piece panel to attain the preselected shape. If a slumping, or sagging, process is used to shape the work piece panel, such processes use the effect of gravity during heating of the work piece panel to cause the work piece panel to make contact with one or more mold surfaces. In accordance with a representative embodiment, the preselected shaping condition(s) includes at least supporting the work piece panel at one or more points on the work piece panel such that the work piece panel is allowed to sag in between the points due to the force of gravity exerted on the work piece panel during heating to cause the work piece panel to attain the preselected shape. If multiple induction coils are used to heat different portions of the work piece panel, the points of support can be distributed in a preselected manner to allow the work piece panel to be shaped into a complex geometry. Also, the different induction coils can be independently controlled so that they heat at different speeds and/or heat their respective portions of the work piece panel to different temperatures to provide additional control of the shaping process.

With reference again to FIGS. 8A-8C, in accordance with this representative embodiment, the work piece panel 81 begins as a substantially flat metal sheet (FIG. 8A) having a plurality of ribs 85 attached to or integrally formed on the panel 81 (FIGS. 8C) that deform during the induction heating. With reference to FIGS. 8C, a plurality of induction coils 83 are used to heat respective portions of the surface of the work piece panel 81 and a plurality of induction coils 84 are used to heat respective features, such as the ribs 85, for example. In accordance with this embodiment, the induction coils 83 and 84 are positioned near or in abutment with the top surface of the work piece panel 81. Induction coils 84 are disposed about the respective ribs 85 and the induction coils 83 are positioned in between the ribs 85. The induction coils 83 and 84 can be independently controlled to independently set the preselected amplitudes and/or preselected frequencies of the induction coils 83 and 84 to independently control induction heating of the different portions of the surface of the work piece panel 81 and of the ribs 85. In accordance with a representative embodiment, the ribs 85 are heated by the respective induction coils 84 at different speeds and/or to different temperatures.

Figure 9:
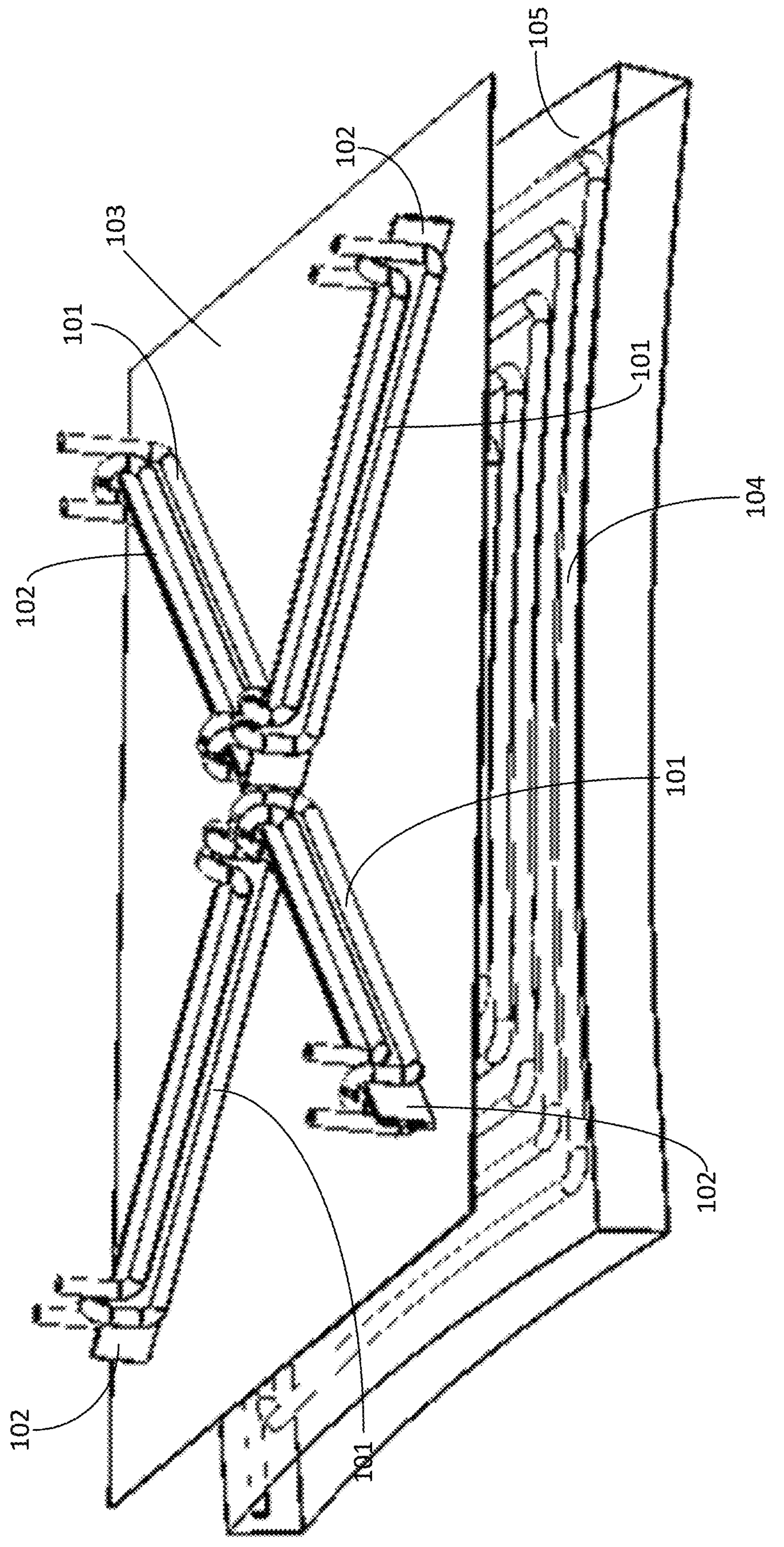
FIG. 9 shows an embodiment that combines various aspects of the embodiments shown in FIGS. 3A, 5 and 8A-8C to provide an induction heating arrangement in which separate induction coils are used to heat respective ribs disposed on a top surface of a work piece panel while a spiral-shaped induction coil embedded in a mold heats the work piece panel.

One or more of the principles and concepts of the embodiments described above with reference to FIGS. 3A-8C can be combined to achieve a desired induction heating shaping goal. For example, FIG. 9 shows a perspective view of an embodiment that combines various aspects of the embodiments shown in FIGS. 3A, 5 and 8A-8C to provide an induction heating arrangement in which separate induction coils 101 are used to heat respective ribs 102 disposed on a top surface of a work piece panel 103 while a spiral-shaped induction coil 104 embedded in a mold 105 heats the work piece panel 103.

In accordance with a representative embodiment, the preselected shaping condition(s) includes applying a mechanical force to the work piece panel that contributes to the work piece panel attaining the preselected shape. For example, in accordance with the embodiment shown in FIG. 9, gravity exerted on the induction coils 101 and the ribs 102 provides a mechanical force that contributes to the shaping of the work piece panel 103 during induction heating. This mechanical force could also be applied by at least a first weight resting on a portion of the work piece panel or on a movable induction coil to increase the gravity load. Mechanical force could also be applied by a second, mating molding surface exerting a force on a second side of the work piece panel 103.

Heating the work piece panel causes a temporary decrement in the yield strength of the material comprising the work piece panel. The shaping is typically caused by the gravity force, and majorly by a rejecting force that the electromagnetic field induces between the coil(s) and the work piece panel.

Figure 10A:
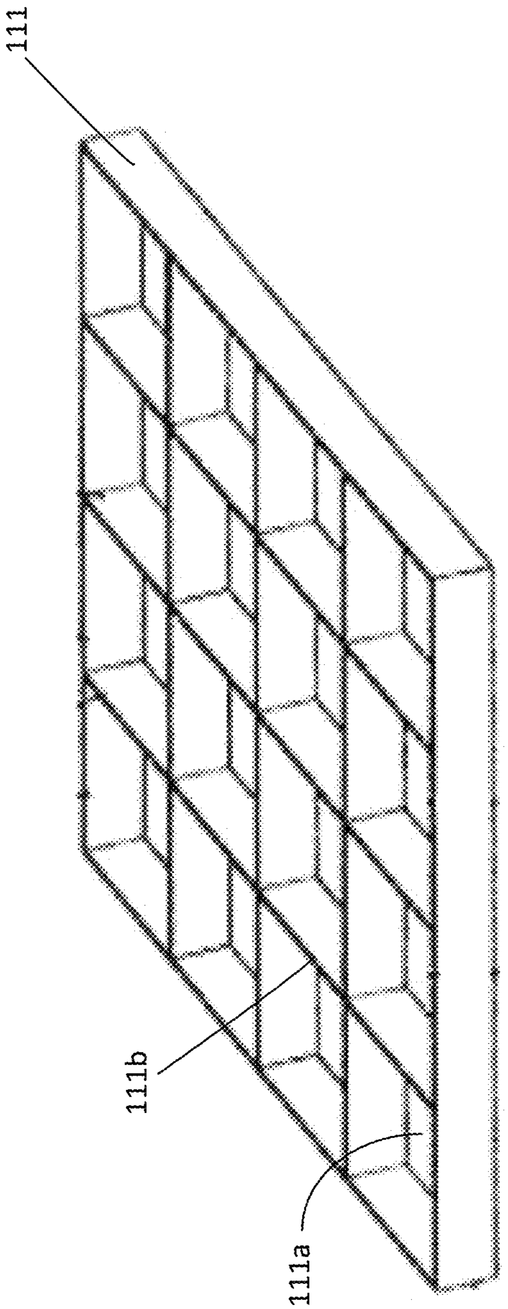
FIGS. 10A and 10B illustrate perspective views of a ribbed work piece panel before and after shaping, respectively, using the induction heating process described herein.
Figure 10B:
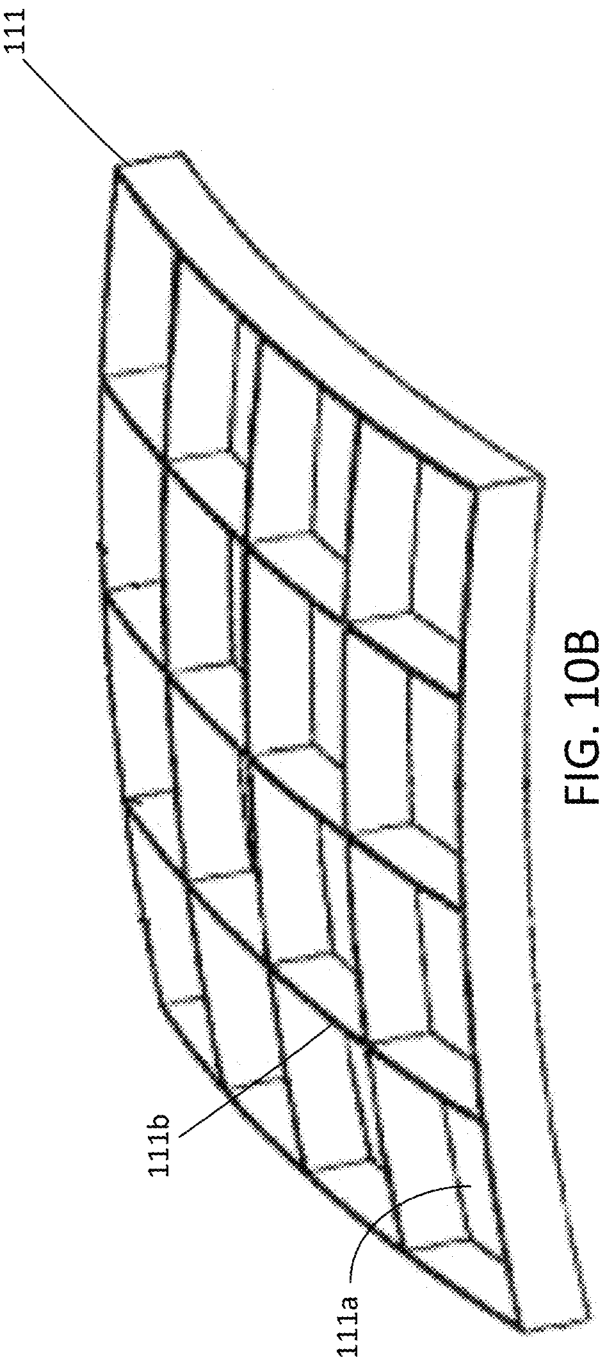

FIGS. 10A and 10B illustrate perspective views of a ribbed work piece panel 111 before and after shaping, respectively, using the induction heating process described herein. The work piece panel 111 has a relatively complex ribbed configuration that can be shaped using one set of induction coils for heating the work piece panel surface 111*a* and another set of induction coils for heating the ribs 111*b*. Such complex ribbed-panels are not easily shaped using known slumping or sagging processes.

In accordance with a representative embodiment, at least a first one of the induction coils moves as a portion of the work piece panel sags during induction heating to follow a changing shape of the work piece panel. In accordance with an embodiment, the movement of the first induction coil is passive, e.g., due to gravity or due to movement of the work piece panel portion on which the coil is located. In accordance with an embodiment, the movement of the induction coil(s) is active, e.g., via the actuator tool(s) 6 under control of the controller 10 (FIG. 1A).

In accordance with a representative embodiment, a shape of at least one induction coil changes as a portion of the work piece panel sags. For example, as depicted in FIG. 3C, the spiral-shaped induction coil 33 is disposed on the top surface of the panel 31 and changes shape as the mold(s) 32 is used to shape the panel 31. An induction coil may be actively moved during induction heating of the work piece panel to maintain or change the distance between the induction coil and the work piece panel to thereby change a speed and/or temperature at which the induction coil heats the work piece panel.

In accordance with a representative embodiment, the method further comprises passing a fluid through at least a first one of the induction coil(s) while passing the AC current through the induction coil to control a temperature of the first induction coil. In accordance with a representative embodiment, the method is performed in an enclosure to limit convection, radiation, and other heat loss. In accordance with a representative embodiment, the method is performed while the work piece panel and the preselected shaping condition(s) (e.g. mold(s)) rotate or translate with respect to at least the first induction coil to attain a controlled heat distribution in the work piece panel.

In accordance with a representative embodiment, the work piece panel is a metal panel, and the alternating electromagnetic field creates an alternating electromagnetic field creating alternating eddy currents in the metal panel that create an opposing electromagnetic field created by the first induction coil causing a repulsive force between the coil(s) and the work piece panel. This force can be used to contribute to the metal panel attaining the preselected shape.

Figure 11:
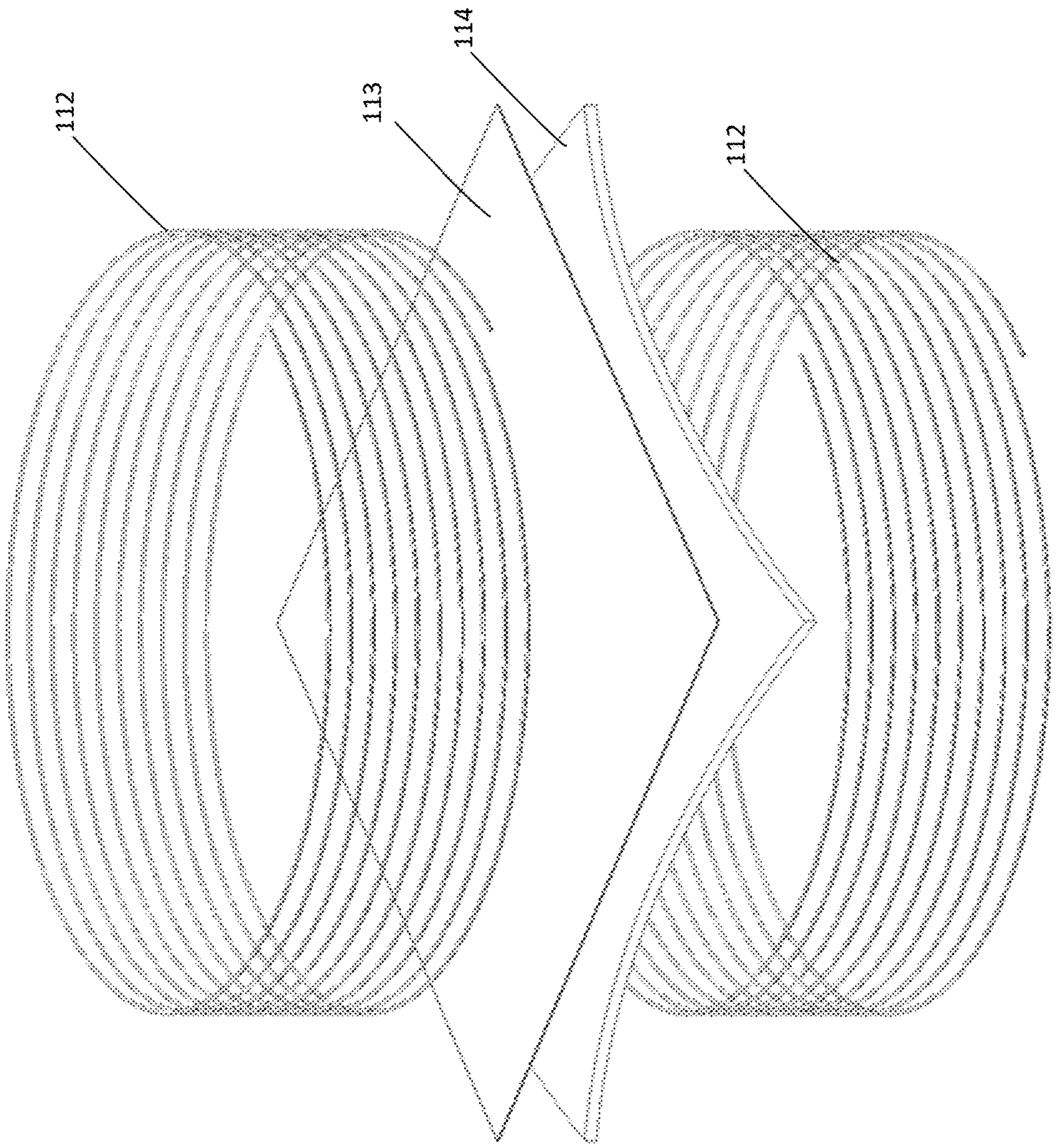
FIG. 11 shows a perspective view of an inductive heating arrangement in accordance with a representative embodiment comprising first and second helix induction coils disposed adjacent to or in contact with a work piece panel and a mold, respectively.
Figure 12:
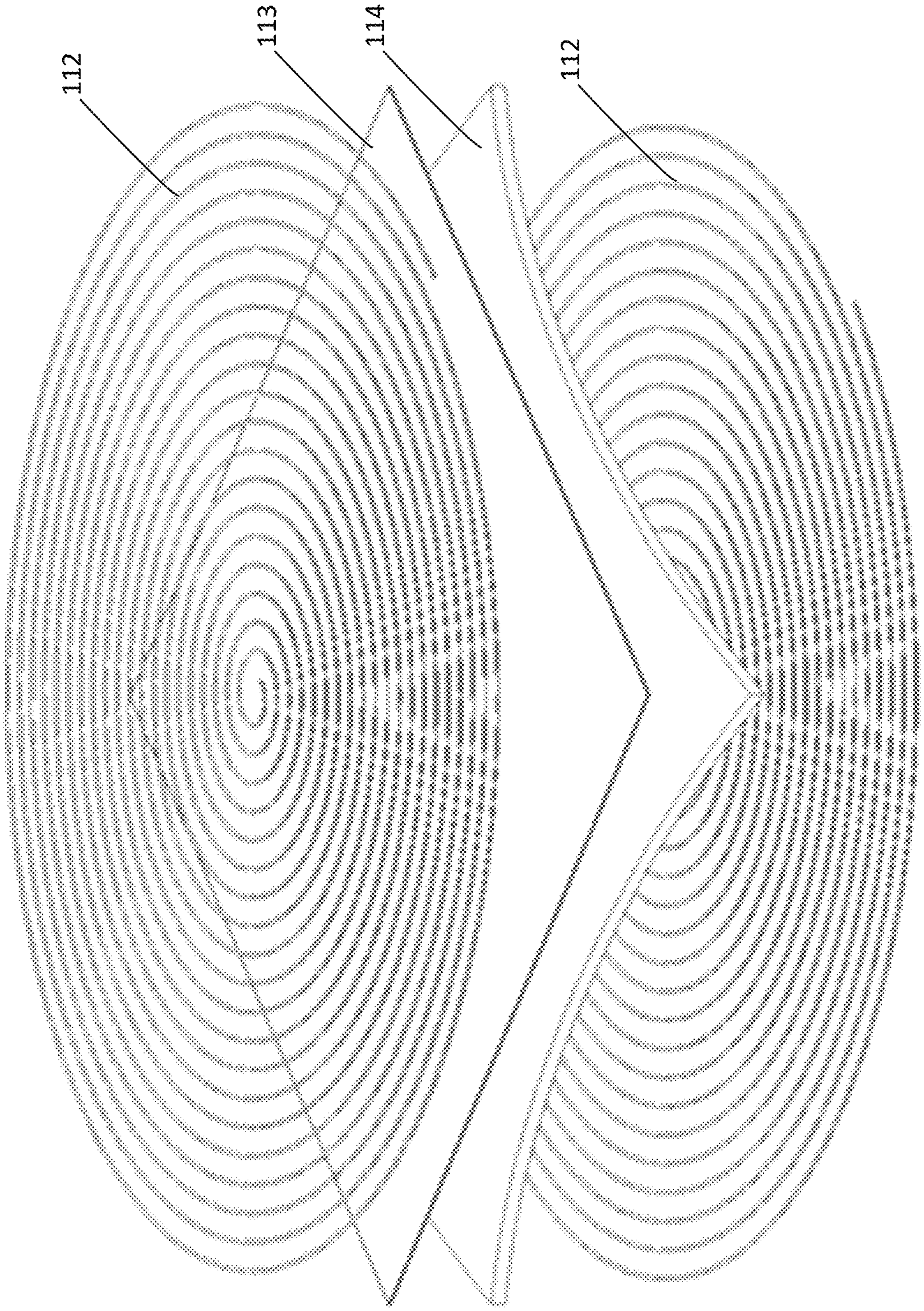
FIG. 12 shows a perspective view of an inductive heating arrangement in accordance with a representative embodiment comprising first and second spiral induction coils disposed adjacent to or in contact with a work piece panel and a mold, respectively.
Figure 13:
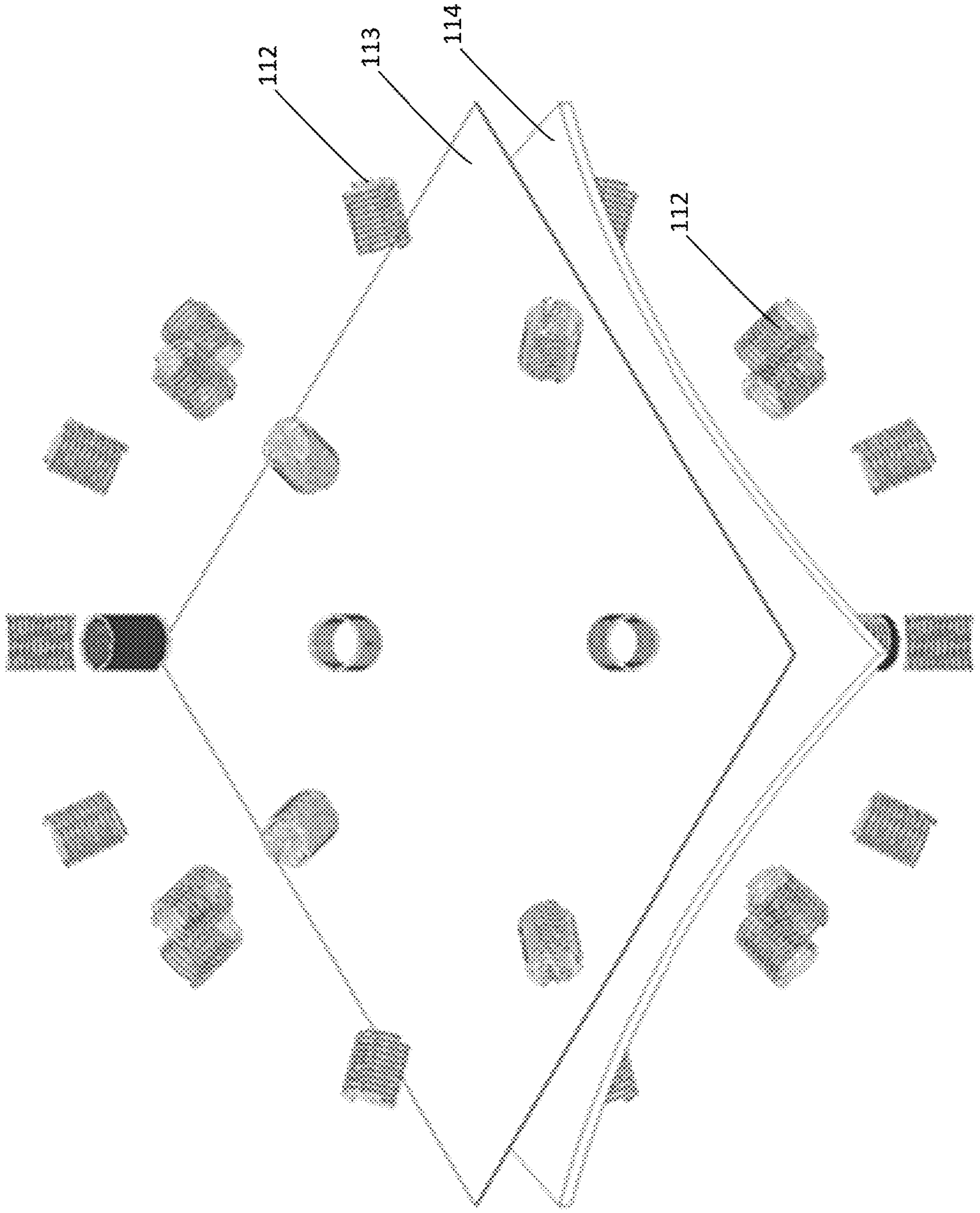
FIG. 13 shows a perspective view of an inductive heating arrangement in accordance with a representative embodiment comprising first and second sets of helix induction coils disposed adjacent to or in contact with a work piece panel and a mold, respectively.

The number, type, position and orientation of the components that are involved in the induction heat process are virtually unlimited. For example, FIGS. 11-13 show perspective views of various inductive heating arrangements where the induction coils 112 have various shapes, positions and orientations relative to the work piece panel 113 and the mold(s) 114. While the work piece panel 113 and the mold(s) 114 are shown as having particular shapes in FIGS. 11-13, they may have any suitable shapes or configurations. For ease of illustration and discussion, the work piece panel 113 is show as being a flat sheet and the mold(s) 114 is shown as being curved, but these components may have a variety of shapes from simple to very complex. For example, the mold(s) 114 may have a shape that is freeform or defined mathematically by a spline or a higher order polynomial.

CONCLUSION

The inventive principles and concepts enable induction heating to be used for the formation of optical quality objects. Some of the applications for the system and method in accordance with the inventive principles and concepts include forming optical grade metal sheets, forming complex metal sheets and forming optical glass through slumping. Some of the advantages of the system and method include providing the capability of thermoforming complex pieces, using metrology systems to improve the process, more easily controlling temperatures while heating a workpiece, a decreasing costs, performing heating in less time and with higher power efficiency than convection and radiation heating. Also, the use of the repelling force between the coil(s) and work piece panel makes it possible to apply controlled pressure in a non-contact manner.

Although the inventive principles and concepts are not limited with regard to areas of technology in which they can be applied, examples of fields of technology in which they can be applied include, for example, antenna panels for radio communications, reflective panels for concentrated solar power, wing panels and fuselage shell panels for the aerospace industry, hood, ceiling, trunk lid, etc., for the automotive industry, exterior and interior facade walls in architecture.

For example, the method and system can be used to mold optical mirrors for concentrated solar power (CSP) systems. Such mirrors can be made of glass or metal. Metal CSP concentrators are currently formed as precision rolled glass. The system and method described herein can be used to precisely form CSP concentrators of glass or metal via induction heating slumping or glass sagging with greater ease and precision and at reduced costs compared to such known processes. It should be noted that the induction heating method and system in accordance with the inventive principles and concepts do not require the use of a mold in all cases. CSP concentrator dishes are used to concentrate solar energy and can be used to generate thermal and/or electrical energy. Solar concentrators generate power differently than photovoltaic cells. They are often used because of their increased efficiency. A Concentrated Solar Power plant can use either oil or salt to generate steam and has the advantage that molten salt or hot oil can be stored for use at night. The panels shaped by the method and system described herein can be used for such purposes and can be made quickly and cost effectively relative to other known manufacturing methods.

It should be noted that the inventive principles and concepts have been described with reference to representative embodiments, but that the inventive principles and concepts are not limited to the representative embodiments described herein. Although the inventive principles and concepts have been illustrated and described in detail in the drawings and in the foregoing description, such illustration and description are to be considered illustrative or exemplary and not restrictive; the invention is not limited to the disclosed embodiments. Other variations to the disclosed embodiments can be understood and effected by those skilled in the art, from a study of the drawings, the disclosure, and the appended claims.

What is claimed is:

1. A method for using induction heating to shape a work piece panel into a preselected shape, the method comprising:

positioning a work piece panel comprising a preselected material near or in abutment with at least a first induction coil, the work piece panel and the at least a first induction coil supported in an unenclosed framework;

subjecting the work piece panel to at least one preselected shaping condition while simultaneously using an alternating current (AC) source to generate a first AC current having a preselected amplitude and frequency, the at least one preselected shaping condition comprising a repulsive force between the first induction coil and the work piece panel; and passing the first AC current having the preselected amplitude and frequency through at least the first induction coil while the work piece panel is subjected to said at least one preselected shaping condition to cause the first induction coil to produce a first alternating electromagnetic field that produces eddy current in the work piece panel that heats the work piece panel to at least one preselected temperature for a preselected period of time, wherein the eddy current in the work piece panel creates an electromagnetic field that opposes the first alternating electromagnetic field, thereby generating the repulsive force between the first induction coil and the work piece panel, wherein heating the work piece panel to the at least one preselected temperature for the preselected period of time while the work piece panel is subjected to said at least one preselected shaping condition comprising the repulsive force causes the work piece panel to attain the preselected shape.

2. The method of claim 1, wherein at least one heating parameter is controlled by adjusting at least one of the frequency or a magnitude of the AC current in the at least a first induction coil, said at least one heating parameter including at least one of a skin depth of induction heating in the work piece panel, and force exerted between the work piece panel and one or more induction coils of said at least a first induction coil.

3. The method of claim 1, wherein said at least one preselected shaping condition includes placing the work piece panel in contact with at least a first molding surface to attain the preselected shape.

4. The method of claim 3, wherein said at least a first molding surface comprises a plurality of segments having respective adjustable positions and orientations relative to the work piece panel to cause the work piece panel to attain the preselected shape.

5. The method of claim 1, wherein said at least a first induction coil comprises an array of more than one induction coils positioned near or in abutment with at least a first side of the work piece to heat at least the first side of the work piece panel via induction to the preselected temperature for the preselected period of time.

6. The method of claim 1, wherein said at least a first induction coil comprises at least first and second induction coils, wherein first and second portions of the work piece panel are positioned near or in abutment with the first and second induction coils, respectively, the method further comprising:

independently controlling the first and second induction coils to thereby independently set the preselected amplitudes and preselected frequencies of the first and second induction coils to independently control induction heating of the first and second portions of the work piece panel by the first and second induction coils, respectively.

7. The system of claim 1, wherein said at least one preselected shaping condition includes applying a mechanical force to the work piece panel that contributes to the work piece panel attaining the preselected shape.

8. The method of claim 1, comprising limiting exposure of the work piece panel to a preselected gas before, during or after heating of the work piece panel.

9. A method for using induction heating to shape a work piece panel into a preselected shape, the method comprising:

positioning and orienting a work piece panel comprising a preselected material near or in abutment with at least a first induction coil;

subjecting the work piece panel to at least one preselected shaping condition;

using an alternating current (AC) source to generate a first AC current having a preselected amplitude and frequency;

passing the first AC current having the preselected amplitude and frequency through at least the first induction coil while the work piece panel is subjected to said at least one preselected shaping condition to cause the first induction coil to produce a first alternating electromagnetic field that produces eddy current in the work piece panel that heats the work piece panel to at least one preselected temperature for a preselected period of time; and using said first induction coil or another induction coil to create eddy current in the work piece panel, wherein the eddy current in the work piece panel creates an electromagnetic field that opposes the first alternating electromagnetic field, thereby generating a repulsive force between the first induction coil and the work piece panel, wherein the repulsive force contributes to the work piece panel attaining the preselected shape.

10. The method of claim 9, wherein said at least a first induction coil comprises at least first and second induction coils, wherein first and second portions of the work piece panel are positioned near or in abutment with the first and second induction coils, respectively, the method further comprising:

independently controlling the first and second induction coils to thereby independently set the preselected amplitudes and preselected frequencies of the first and second induction coils.

11. The method of claim 9, wherein at least one heating parameter is controlled by adjusting at least one of the frequency and a magnitude of the AC current in the induction coil, said at least one heating parameter including at least one of a skin depth of induction heating in the work piece panel, power transmitted to the work piece panel, and force exerted between the work piece panel at one or more induction coils of said at least a first induction coil.

12. The method of claim 9, further comprising:

measuring the shape of at least a portion of the work piece panel during heating to obtain at least a first shape deformation measurement; and adjusting at least one of the preselected frequency, the preselected amplitude, the location of said at least a first induction coil, an orientation of said at least a first induction coil and said at least one preselected shaping condition based at least partially on said at least a first shape deformation measurement.

13. The method of claim 9, wherein the positioning and orientating of the work piece panel and the subjection of the work piece panel to said at least one preselected shaping condition are such that at least a portion of the work piece panel deforms to attain the preselected shape, and wherein at least one of the position of said at least a first induction coil, the orientation of said at least a first induction coil, and a shape of said at least a first induction coil is changed as said portion of the work piece panel deforms.

14. The method of claim 9, further comprising:

actively moving at least one induction coil of said at least a first induction coil relative to the work piece panel during induction heating of the work piece panel to change a local strength of the alternating electromagnetic field produced by said at least one induction coil.

15. The method of claim 9, wherein the method is performed in an enclosure to limit at least one of convection, radiation, heat loss, and exposure of the work piece panel to a preselected gas before, during or after heating of the work piece panel.

16. A system for using induction heating to shape a work piece panel into a preselected shape, the system comprising:

a holder that holds a work piece panel comprising a preselected material in a predetermined position and orientation near or in abutment with at least a first induction coil while simultaneously subjecting the work piece panel to at least one preselected shaping condition, the holder, work piece panel and the at least a first induction coil supported in an unenclosed framework, the at least one preselected shaping condition comprising a repulsive force between the first induction coil and the work piece panel;

at least a first alternating current (AC) source that generates a first AC current having a preselected amplitude and frequency; and at least the first induction coil electrically coupled to the AC current source such that the first AC current is passed through at least the first induction coil while the work piece panel is subjected to said at least one preselected shaping condition to cause the first induction coil to produce a first alternating electromagnetic field that produces eddy current in the work piece panel that heats the work piece panel to a preselected temperature for a preselected period of time, wherein the eddy current in the work piece panel creates an electromagnetic field that opposes the first alternating electromagnetic field, thereby generating the repulsive force between the first induction coil and the work piece panel, wherein heating the work piece panel to the preselected temperature for the preselected period of time while the work piece panel is subjected to said at least one preselected shaping condition comprising the repulsive force causes the work piece panel to attain the preselected shape.

17. The system of claim 16, wherein said at least a first induction coil is shaped to follow contours of features on the work piece panel.

18. The system of claim 16, wherein said at least a first induction coil comprises a plurality of induction coils, at least one of said plurality of induction coils being positioned and oriented to have at least one configuration of (1) wrapping around the work piece panel, (2) wrapping around the work piece panel and a first molding surface that is in contact with the work piece panel, or (3) wrapping around the work piece panel and passing through at least the first molding surface.

19. The system of claim 16, wherein said at least a first induction coil creates eddy current in the work piece panel, the eddy current creating an electromagnetic field that opposes the alternating electromagnetic field created by said at least a first induction coil, thereby generating a repulsive force between said at least a first induction coil and the work piece panel that contributes to the work piece panel attaining the preselected shape.

20. The system of claim 16, wherein said at least one preselected shaping condition comprises applying at least a first molding surface to the workpiece panel, wherein said at least a first molding surface comprises a plurality of segments having respective adjustable positions and orientations relative to the work piece panel to cause the work piece panel to attain the preselected shape, the repulsive force or repulsive forces between said at least a first induction coil and the work piece panel pressing the work piece panel toward the first molding surface.

* * * * *